(12) United States Patent
Nadzam et al.

(10) Patent No.: US 7,173,214 B2
(45) Date of Patent: Feb. 6, 2007

(54) ELECTRIC ARC PULSE WELDER WITH SHORT CIRCUIT CONTROL

(75) Inventors: Jeffrey T. Nadzam, Westlake, OH (US); Steven R. Peters, Huntsburg, OH (US)

(73) Assignee: Lincoln Global, Inc., Monterey Park, CA (US)

(*) Notice: Subject to any disclaimer, the term of this patent is extended or adjusted under 35 U.S.C. 154(b) by 299 days.

(21) Appl. No.: 10/815,078

(22) Filed: Apr. 1, 2004

(65) Prior Publication Data
US 2005/0224481 A1    Oct. 13, 2005

(51) Int. Cl.
*B23K 9/09* (2006.01)

(52) U.S. Cl. .............................. 219/130.51; 219/130.21

(58) Field of Classification Search ........... 219/130.51, 219/130.21
See application file for complete search history.

(56) References Cited

U.S. PATENT DOCUMENTS

| 4,697,062 | A  | * | 9/1987  | Awano et al. .......... 219/130.51 |
| 4,866,247 | A  |   | 9/1989  | Parks et al. |
| 6,441,342 | B1 |   | 8/2002  | Hsu |
| 6,498,321 | B1 |   | 12/2002 | Fulmer et al. |
| 6,617,549 | B2 | * | 9/2003  | Ihde ....................... 219/130.51 |

* cited by examiner

*Primary Examiner*—Clifford C. Shaw
(74) *Attorney, Agent, or Firm*—Fay, Sharpe, Fagan, Minnich & McKee, LLP

(57) ABSTRACT

An electric arc welder with a waveform generator controlled to create a welding process involving current flow between an electrode and a workpiece wherein the welding process comprises a succession of pulse waveforms, each having a current ramp up portion, a peak current portion, a current ramp down portion and a background current portion, a voltage sensing circuit to sense a short circuit between the electrode and the workpiece and a reset circuit to reset the waveform generator upon sensing of a short circuit. The preferred electrode is a solid wire which may be in the form of a metal cored wire.

55 Claims, 6 Drawing Sheets

CONVENTIONAL PULSE WAVE FORM

ELECTRIC ARC PULSE WELDER WITH SHORT CIRCUIT CONTROL

The present invention relates to the art of electric arc welding and more particularly to a electric arc pulse welder with short circuit control.

BACKGROUND OF INVENTION

When using waveform technology for pulse spray welding, a series of waveforms are created where each of the waveforms includes a current ramp up portion, a peak current portion, a current ramp down portion and a background current portion. The individual waveforms are created by a series of short current pulses generally controlled by a pulse width modulator providing pulses of a given duration to operate a high switching speed power source, such as an inverter or an equivalent chopper. The profile of the individual waveforms that are created in succession to provide a spray pulsed welding process is controlled by a waveform generator or wave shaper having an output control signal. This signal, digital or analog, determines the duty cycle of pulses from the pulse wave modulator operated at a frequency greater than 18–20 kHz. This waveform technology for setting the profile of the pulse waveforms for a pulse welding process accurately controls the profile of each successive pulse or waveform. Thus, there can be a uniform pulse spray welding process performed by the welder. Such process is used extensively in filling the root of a groove between heavy workpieces, such as a pipe joint or the joint between heavy structural plates in welding for off shore platforms. In the past, such processes normally used flux cored electrodes which introduced certain difficulties in controlling quality of the weld bead. Indeed, fabrications by flux cored electrodes require precautions to guard against excessive diffusible hydrogen in the weld metal. Consequently, even though using flux cored electrodes has been successful, the lower bead of the welding process for closing the root often had to be deposited by an STT welding process to control the heat so that out-of-position welding could be performed. It has been found that the pulse welding process was not as robust as desired since one of the disadvantages of pulse welding is the low heat input at the time of a short circuit. The short circuits were addressed by detecting the existence of a short circuit and then increasing the current at a controlled rate until the short circuit was broken. Then, the weld process would continue. This intermittent increase in current merely burnt off the short circuit and interrupted the quality of the weld bead. Consequently, pulse spray electric arc welding has not been completely satisfactory for welding of a open root pass in heavy welding operations, especially when using solid wire electrodes.

THE PRESENT INVENTION

The present invention provides a welding process with consistent lower hydrogen weld deposits, higher electrode efficiencies and improved operating features compared to the previous flux cored welding procedure. The invention is used with a gas shielding and preferably employs solid metal wire. This wire provides reduced hydrogen in weld deposits, but was not the wire of choice in the prior process. The pulse welding process of the invention has an improved procedure for addressing short circuits that occur randomly. In this manner, solid wire with gas shielding can be used in electric arc pulse welding to overcome the disadvantages of previous processes using flux cored electrodes. The present invention relates to a pulse spray process to transfer metal, which process uses a novel procedure and method of removing inadvertent, randomly occurring short circuits between an electrode and workpiece. By using the present invention, the hydrogen is reduced in the metal deposit tending to eliminate the occurrence of hydrogen assisted cracking. Although the invention is described and has been developed for a single solid wire electrode, the new process is also suitable for use in multiple arc processes using tandem electrodes each driven by a high speed switching power source, such as an inverter or chopper. The power source or sources each output a succession of pulse waveforms created by a pulse waveform generator or wave shaper. The invention is optimized when using a Super Arc LA-75 solid wire electrode and shielding gas in combination in order to meet or exceed Charpy impact values of 35 ft-lbs at −40° F. The process developed in accordance with the present invention is useful in all welding positions and is referred to by the acronym GMAW-P. The process of the present invention lowers diffusible hydrogen and reduces or eliminates the holding time requirement for completed weldment prior to non-destructive examination.

The invention uses a standard power source that can provide waveform technology, such as a Power Wave 455 manufactured and sold by The Lincoln Electric Company of Cleveland, Ohio, a pioneer in waveform technology. Waveform technology is a shorthand for a welding process using a high switching speed power source, such as an inverter or chopper with waveforms created in succession. Each waveform has a profile determined by the program of the waveform generator or wave shaper having an output signal controlling the operation, on a time basis, of a pulse width modulator of the power source controller. The pulse width modulator operates at a frequency greater than 18–20 kHz. The ability to use a pulsed spray welding process with a solid metal wire or electrode is enhanced and made possible by using the present invention.

In accordance with the preferred embodiment of the present invention there is provided an electric welder with a waveform generator. The welder uses standard waveform technology to create a welding process involving profiled current flow between an electrode and a workpiece. The welding process in the present invention is a pulsed spray process, wherein each waveform caused by the waveform generator has a current up ramp portion, a peak current portion, a current ramp down portion and a background current portion. Ramps are made possible by use of waveform technology pioneered by Lincoln Electric. Other pulsed waveforms have no defined ramp up portion or ramp down portion. The heat of the welding process is determined by the peak current and the background current whether or not ramps are used, each of which adds heat to the welding process. To control the heat of the welding process, the peak current can be adjusted, the background current can be adjusted or ratio of time of the peak current to time of the background current can be adjusted. These features all involve standard prior art technology, wherein the profile of successive waveforms is controlled by the waveform generator through the use of a pulse width modulator, that is normally a software circuit but may be an analog circuit. The pulse width modulator controls a high switching speed inverter or a chopper, which chopper can be considered equivalent to an inverter in a waveform technology welder. As so far described, the welder is standard and employs a waveform generator to control the waveforms of a pulsed spray welding process. In accordance with the invention, this type welder is provided with a voltage sensing circuit to sense a short circuit between the electrode and the workpiece and a circuit to reset the waveform generator to the starting point or starting time of the waveform when a short circuit occurs. When there is a detected short circuit during the pulse welding process, the welder initiates the next pulse current waveform. The present invention differs from the prior pulsed spray welding process using waveform technology or otherwise by this improvement, wherein the next waveform with or without ramps can be initiated on the occurrence of a short circuit. The next current pulse immediately clears the short circuit and proceeds with the pulsed spray welding process. It has been found that by using this process, gas shielded, solid wire or metal cored wire can be used to produce a robust welding operation out-of-position. It has been established that this improved process is superior to conventional FCAW processes in that it promotes a process with a lower hydrogen weld deposit, which reduces the tendency to have hydrogen assisted cracking. The process of the present invention lowers the diffusible hydrogen and controls the length of the arc to produce a flattened bead when used out-of-position. The time that a short circuit occurs during the pulse automatically determines the amount of heat added to the welding process.

Another aspect of the present invention is the provision of a short circuit clearing program or circuit to be used if the short circuit continues after the next pulse has been created and progressed to the peak current level. If there is a short circuit to activate the present invention and the next pulse waveform does not clear the short circuit during the ramp up portion, there is a routine to further increase current above the peak current to insure the short circuit is cleared. Consequently, the basic aspect of the present invention is used during the current ramp down and background current portions when a short circuit is more likely to occur. If the short circuit continues, a standard current increase routine is used to break the short circuit.

The primary object of the present invention is to provide an improved pulsed spray welding process or mode of metal transfer, which process is preferably performed by waveform technology and allows the use of a solid metal electrode or wire with gas shielding so the welding process is robust and operable out-of-position without the vicissitudes caused by previous processes where the short circuit condition is merely removed by increased current. The invention is used where solid wire was difficult or not possible to use. But, cored wire can be used in practicing the invention.

Another object of the present invention is the provision of an improved electric welder operated in a pulsed spray mode with an improved short circuit control procedure to perform the welding process defined above.

Yet another object of the present invention is the provision of a welder and method, as defined above, which welder and method can uses a solid wire to reduce the amount of diffused hydrogen in the weld bead. The invention starts the next pulse waveform upon occurrence of a short circuit. There is the ability to use a solid wire because the new shorting routine can be used in applications where solid wire was difficult or not possible to use before. The solid wire is lower in hydrogen than flux cored wires. The resulting welding contains less diffused hydrogen.

Still another object of the invention is the use of a shorting routine allowing use of solid metal wire, but applicable to core welding wire also, with or without shielding gas.

These and other objects and advantages will become apparent from the following description taken together with the accompanying drawings.

PREFERRED EMBODIMENT

Figure 1:
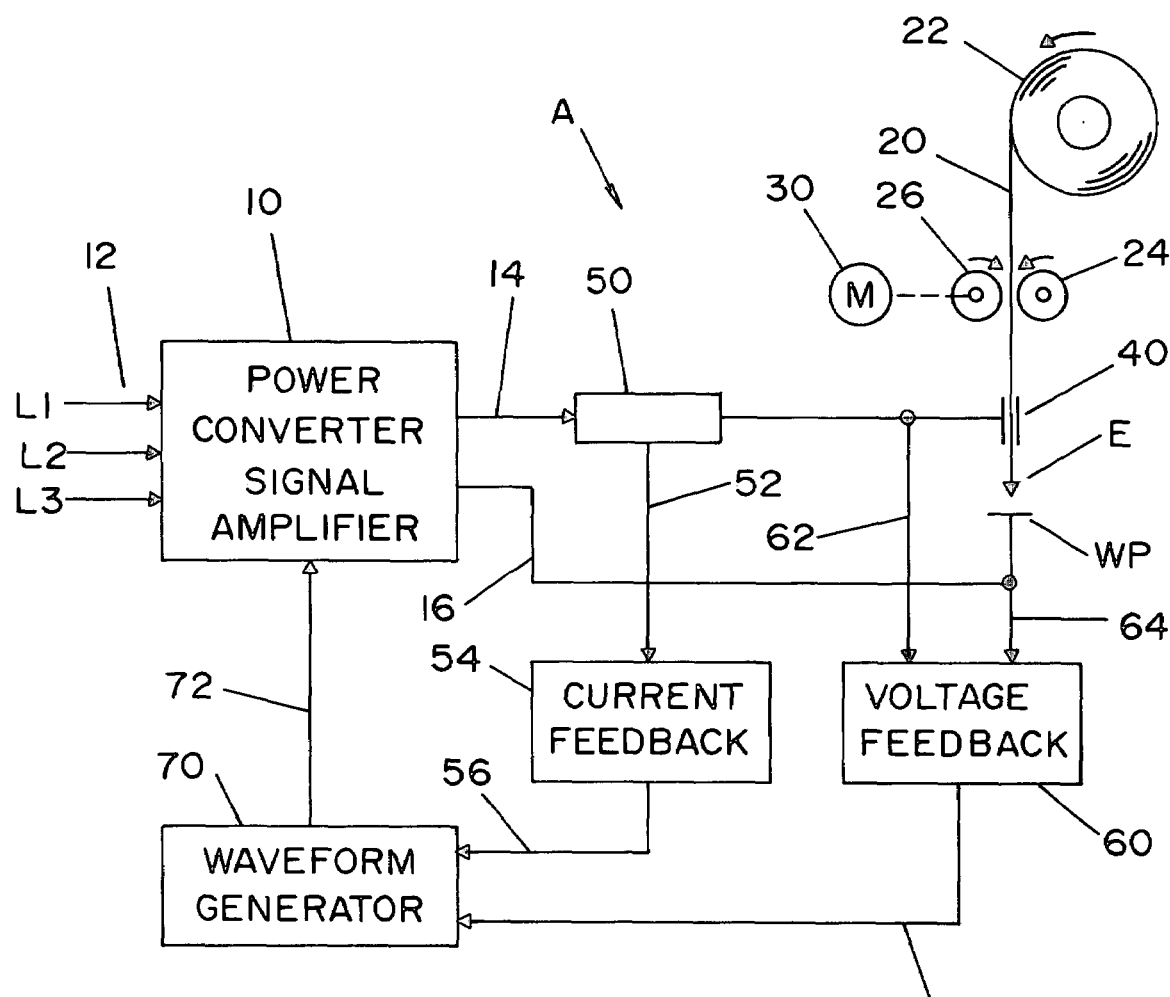
FIG. 1 is a block diagram schematically illustrating an electric arc welder using waveform technology for controlling a series of waveforms constituting a welding process.
Figure 4:
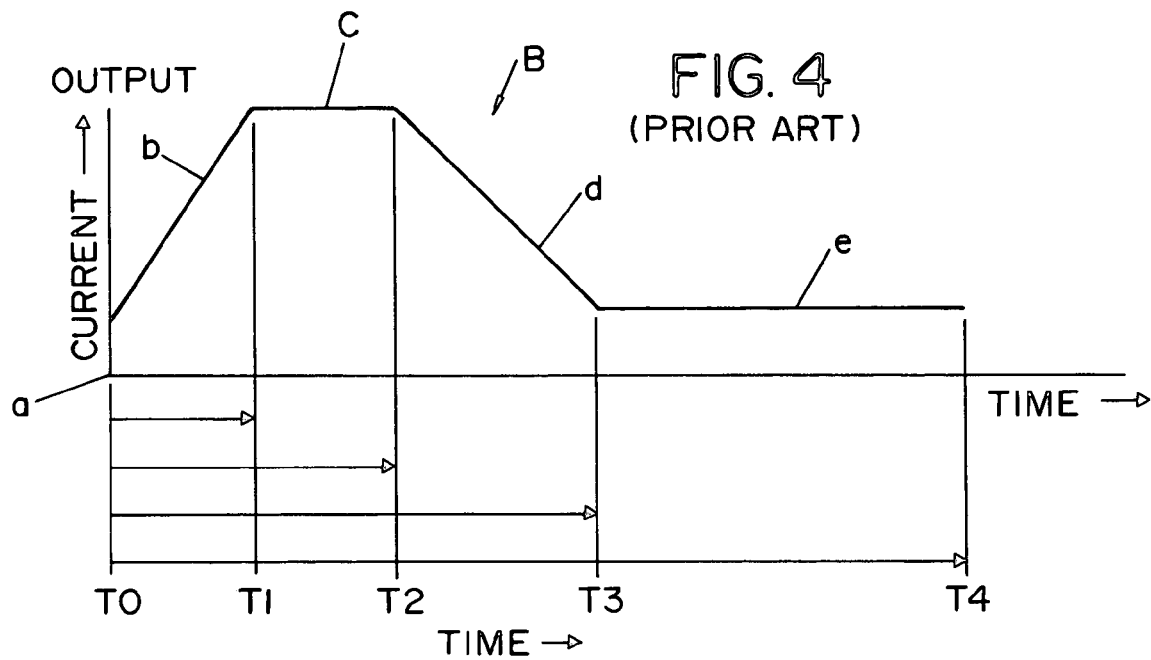
FIG. 4 is a schematic illustration of the somewhat standard waveform used in performing a pulsed spray welding process by operation of a welder such as disclosed in FIG. 1.

The pulsed spray weld process improved by use of the present invention employs a standard electric arc welder, such as welder A show in FIG. 1 wherein power source 10 is a high switching speed power source, such as an inverter or chopper, with an input power supply 12 illustrated as a three phase electrical input. Of course, a single phase input power supply having various voltages and frequencies or even a motor or engine driven generator or alternator could be used to direct electrical power to converter or power source 10. Output leads 14, 16 are connected in series across electrode E and workpiece WP to perform a welding process by directing current between the electrode and workpiece. In accordance with standard practice, the electrode is a continuous wire which in the prior art was a flux cored wire, but in the present invention a solid wire can be used. This was not possible in some off-shore applications before use of the present invention. By using solid wire the hydrogen in the weld bead is reduced to reduce hydrogen assisted cracking. In accordance with the preferred embodiment of the invention, the solid wire has a shielding gas formed of 95% argon and 5% carbon dioxide The shielding gas supply is directed into the welding operation between the electrode and workpiece in accordance with standard practice. The invention allows use of solid wire to replace cored wire heretofore required when using pulsed spray welding. Wire 20 is pulled from spool 22 between drive rolls 24, 26 rotated by motor 30 in accordance with standard technology. Contact sleeve 40 is used to direct electrical current from power source 10 to electrode E so that the welding process performed between the electrode and workpiece comprises the current waveforms between outputs 14, 16. To determine the arc current, shunt 50 creates a signal in line 52 directed to feedback circuit 54 so that the output signal on line 56 is a digital or analog representation of the actual output current at any given time. In a like manner, voltage feedback circuit 60 has inputs 62, 64 for sensing the instantaneous arc voltage of the welding operation to create a signal in output 66. This voltage signal is a digital or analog representation of the instantaneous arc voltage. The arc current and voltage are directed in a feedback loop to waveform generator 70 which generator is set to create a series of waveforms each with a selected profile, in accordance with a signal in control line 72. The control signal represents the desired pulse waveform. Output control signal in line 72 is either in the form of digital instructions, a program statement or an analog command signal in accordance with standard waveform technology. Inside the controller of the power source is a pulse width modulator circuit, normally a software signal, which circuit controls the waveforms in the welding process between electrode E and workpiece WP. This is a waveform to create a pulsed spray welding process. A standard waveform created by the signal in line 72 from generator 70 is schematically illustrated in FIG. 4. Waveform B has a standard profile from a start position a at time T0. To create the pulse profile, a current ramp up portion b is created by generator 70 until the lapsed time T1. Thereafter, waveform B progresses into a current peak portion c that lasts until lapsed time T2. After the peak current portion is performed, waveform B shifts into a current down ramp d terminating at time T3 where the waveform is shifted to the background current portion e. This portion terminates at lapsed time T4 corresponding with waveform start time T0. The invention is preferably performed in a waveform technology welder with a waveform B. However, other welders can use the invention and the waveform but such other welders may not have the ramp up portion or a ramp down portion. The invention can still be used effectively to allow use of solid wire when such wire was not practical so a FCAW was necessary.

Figure 2:
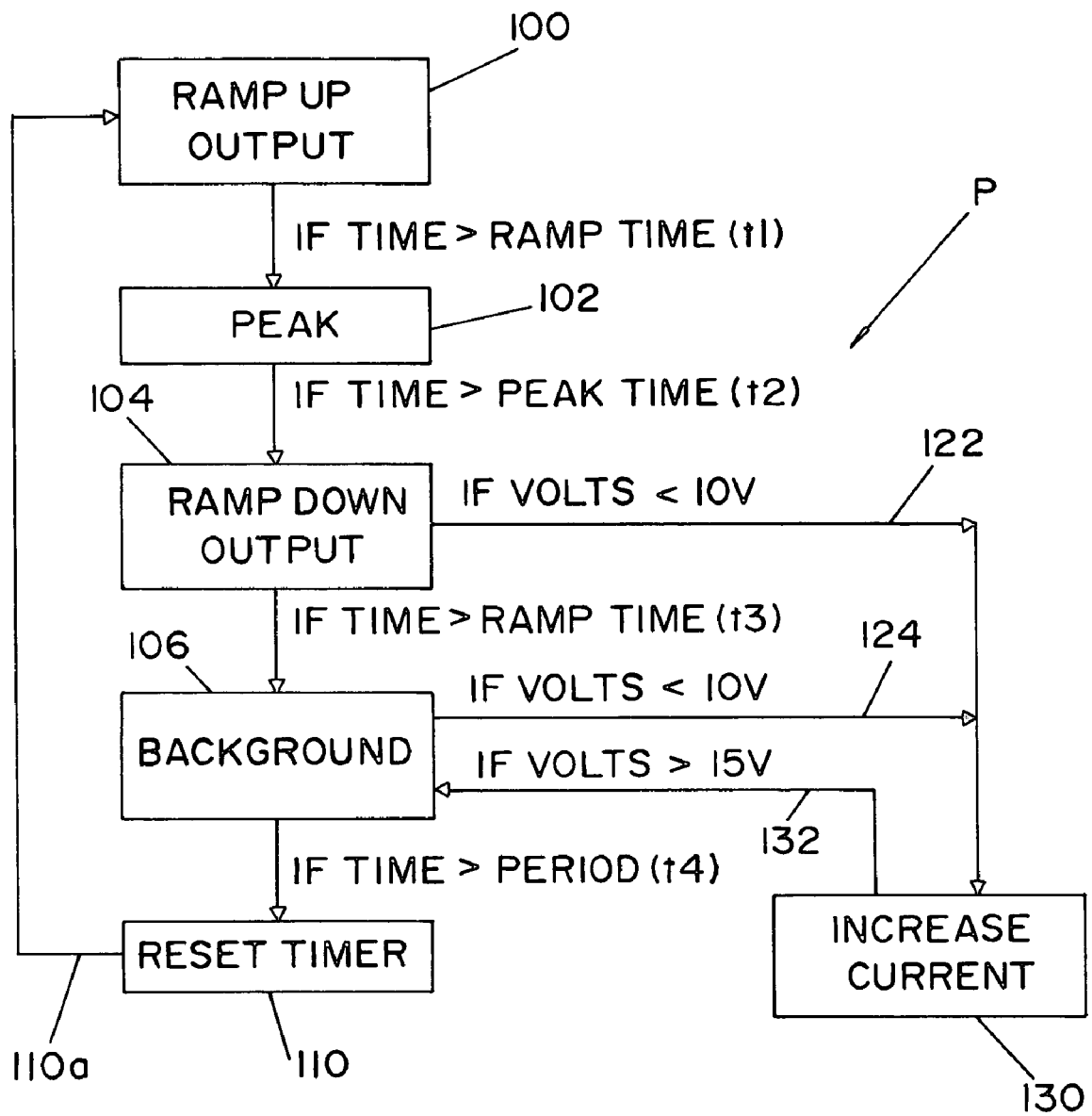
FIG. 2 is a flow chart illustrating operation of the welder shown in FIG. 1 to process a standard pulsed spray welding process.
Figure 3:
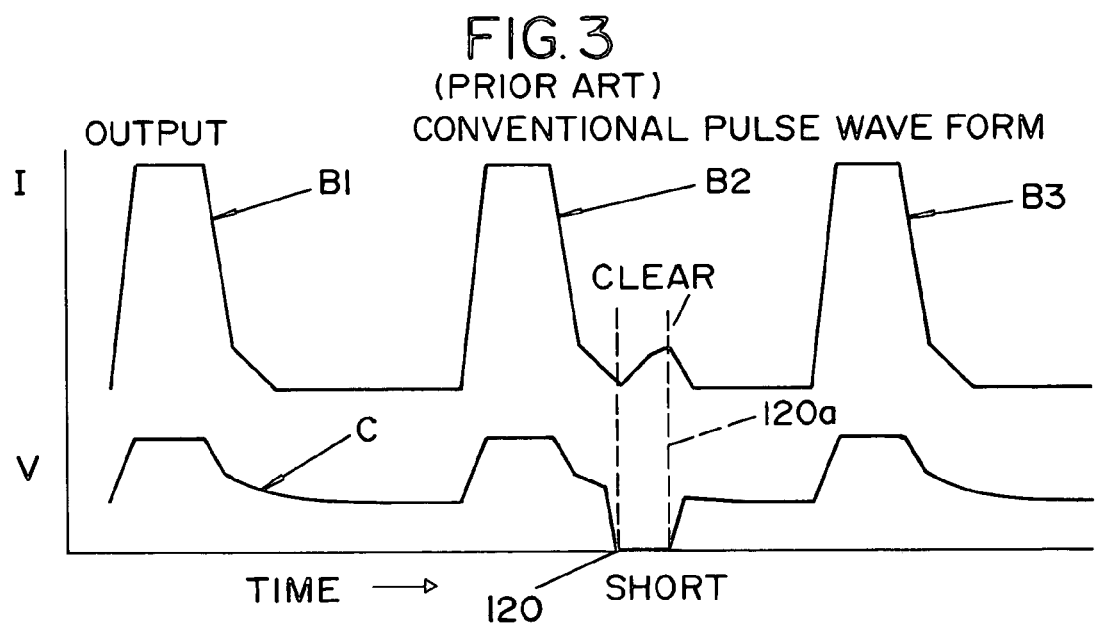
FIG. 3 is a graph showing the current curve and voltage curve of the pulsed spray welding process performed by the program using the flow chart of FIG. 2 to operate a standard welder disclosed in FIG. 1.

Standard waveform technology preferably used in the invention repeatedly outputs waveform B under control of generator 70 to produce a pulsed spray welding process. The waveform generator is a processor that synthesizes a waveform based upon a series of instructions and true/false statements. The waveform generator regulates the instructions from the current feedback signal 56. When this signal is correct, the generator then processes the signal on line 66 so that both a current and a voltage waveform is controlled by generator 70. Voltage and current signals are fed back to waveform generator 70 by lines 56, 66 to correct the output control signal 72 in order to correct the signal and produce the desired waveform between electrode E and workpiece WP. This process is implemented by various methods that are well known in the art of using waveform technology to control successive pulse waveforms. The waveform technology process can be optimized by proper selection of parameters defining the profile of waveform B. However, when there is an inadvertent, unexpected, unplanned short circuit between the electrode and workpiece, the quality of the weld created by waveform B is adversely affected. Less energy is directed to the welding process because the resistance experienced by the power source is drastically reduced. Consequently, it is necessary to immediately address a short circuit condition to again reestablish the optimized waveforms necessary for quality performance of the welding operation. In the prior art, waveform technology or other pulsed spray waveform processes form the pulses. In some of the prior art there is no distinct, ramp up portion or ramp down portion. These portions are obtainable using waveform technology. The invention is equally applicable to other pulsed spray welding processes. A prior art process was accomplished by the system and graph illustrated in FIGS. 2 and 3. Conventional waveforms B1, B2 and B3 are generated together with voltage waveform C as shown in FIG. 3. To create these waveforms, which are to be optimized as shown in FIG. 4, the flow chart of FIG. 2 is implemented to perform a program or routine P. Generator 70 causes a current ramp up portion as indicated by block 100. This control portion of the waveform is terminated after time TI to create a peak current portion as indicated by block 102. This peak current portion continues until time T2 at which time block 104 is activated to ramp down the current of the welding process. At time T3, a background current indicated by block 106 is implemented until time T4. Then generator 70 is reset by timer 110 as indicated by line 110a to again start the timer to implement the waveform shown in FIG. 4. Waveform B is schematically illustrated in FIG. 3; however, the welding process is abruptly changed when there is a short circuit. This is illustrated as occurring at point 120. At this time, the sensed voltage is less than a reference voltage in accordance with standard technology. The short circuit creates a signal illustrated as a signal in line 122 shown in FIG. 2 if the short circuit occurs during the ramp down. If a short occurs in the background portion of the waveform a signal is created as illustrated in line 124. A signal in line 122 or line 124 activates the short circuit clearing circuit 130 to increase the current flowing between the electrode and workpiece. This terminates the short circuit. When the short circuit has terminated, the voltage sensed by the welder increases to a level indicated in program P to be 15 volts. When this happens, a return line 132 is activated so that circuit 130 is terminated and the normal pulse waveforms are again processed. This is standard technology and causes some instability in the welding process. Interruption of the normal pulse welding process prevents solid wires from being transferred effectively in pulsed spray welding, especially when used in the large welding environments, such as pipe welding and offshore construction. After the increased current clears the short circuit at point 120a program P represented by the block diagram in FIG. 2 is again implemented. The heat is drastically increased to cause problems in out-of-position welding. If the prior art process is used in open root welding, the high current flow to burn off the short circuit has a tendency to also liquefy the welding metal and possibly burn through the root. Consequently, existing pulse welding procedure implemented by welder A in FIG. 1 using program P of block diagram in FIG. 2 has the result shown in FIG. 3 when there is a short circuit at point 120. Using a conventional pulse program (waveform technology or otherwise), the process is not stable at lower voltages and therefore operates too hot for the root pass. The new pulse waveform is very robust at lower voltages and can put in the root pass at the necessary heat input. The present invention is an improvement to the existing short circuit processing procedure that makes the welding waveform more forgiving in the prevention of stubbing from excessive shorting events. When the electrode shorts at point 120 the present invention quickly responds to supply more heat in a short period of time without giving the electrode time to burn through or excessively melt as can result when using the prior art.

Figure 5:
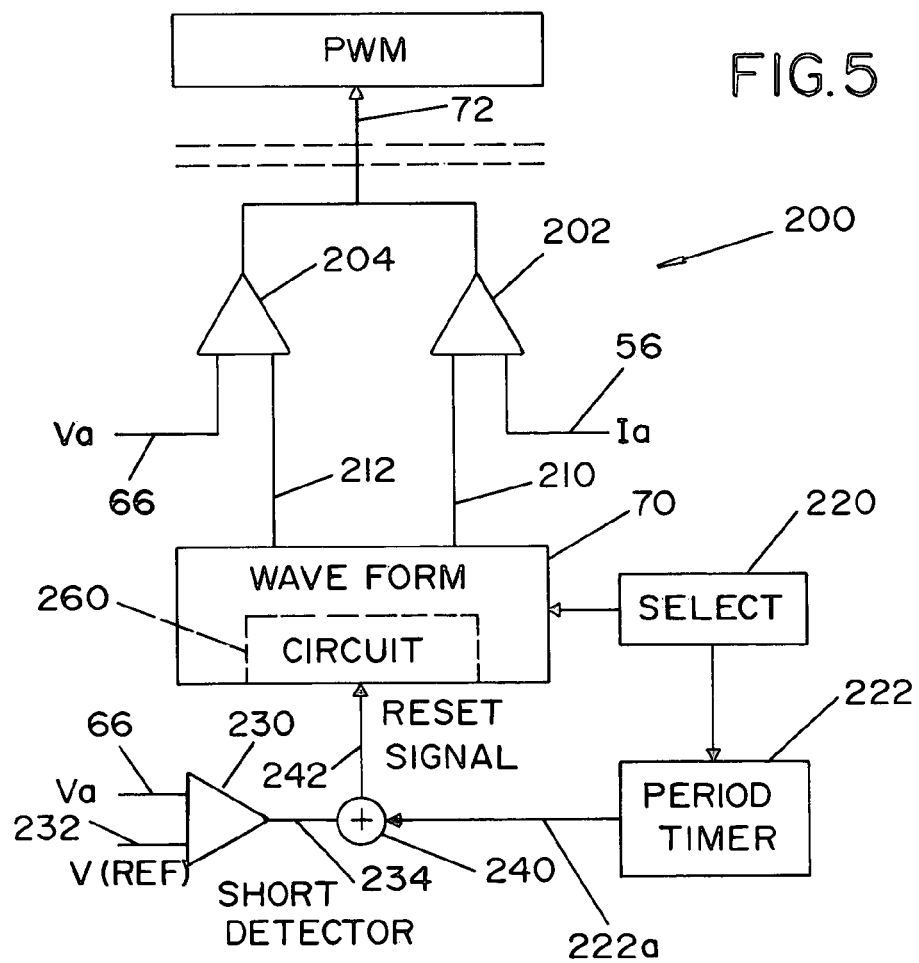
FIG. 5 is a schematic block diagram schematically illustrating the control architecture in practicing the preferred embodiment of the present invention.
Figure 6:
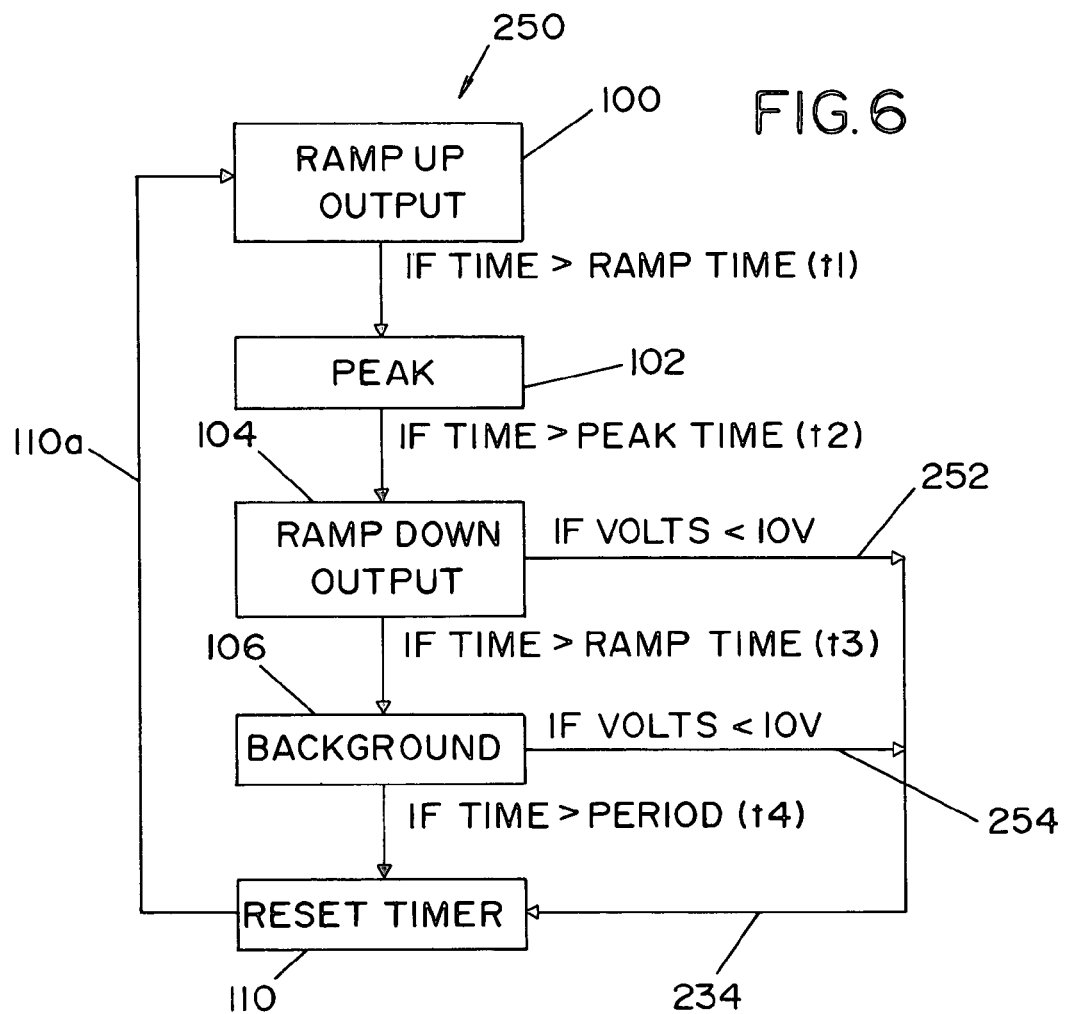
FIG. 6 is a flow chart similar to the flow chart in FIG. 2 but illustrating the program for implementing the preferred embodiment of the present invention.
Figure 7:
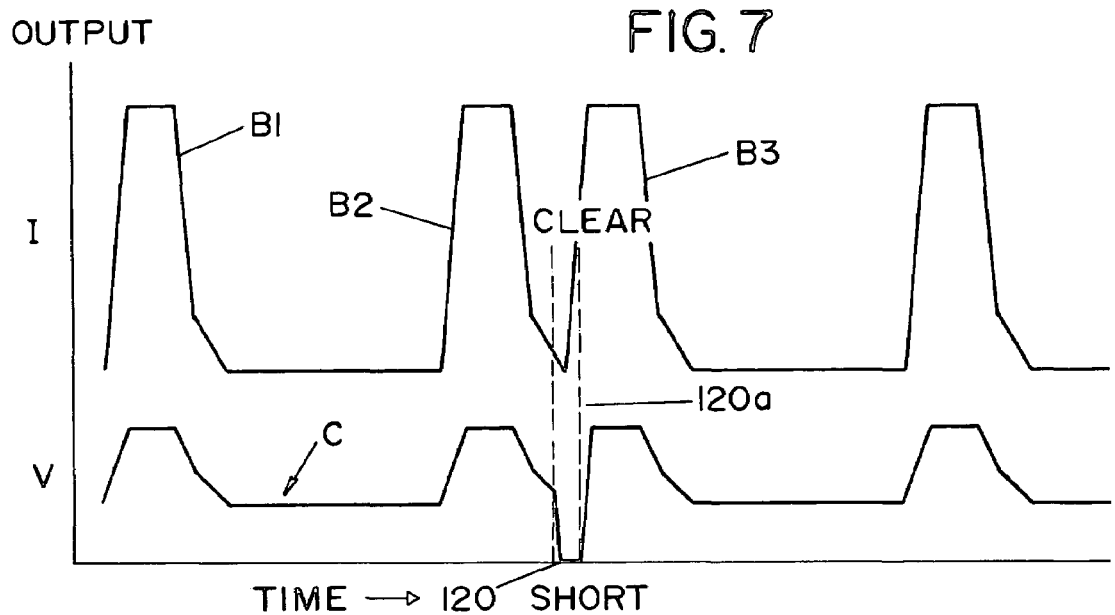
FIG. 7 is a graph similar to FIG. 3 showing the current curve and voltage curve of the welding process performed by using the method and program disclosed in FIG. 6.
Figure 10:
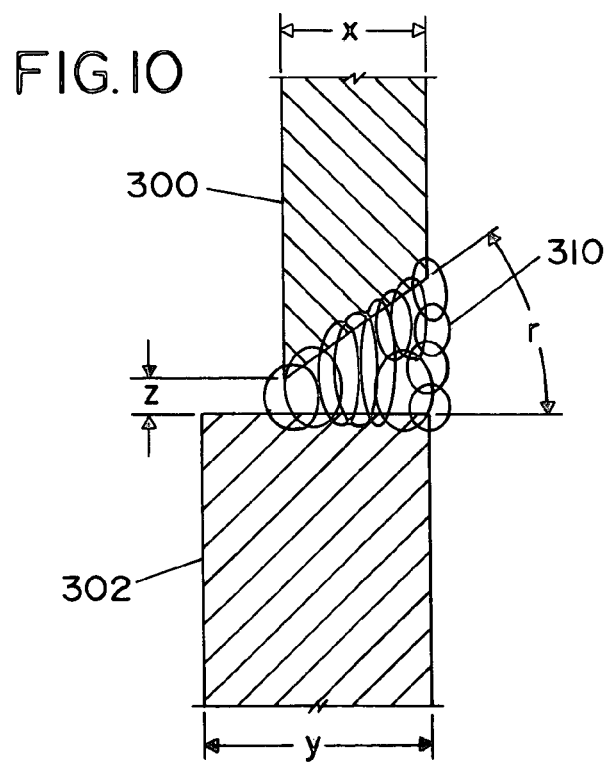

The present invention is illustrated in FIGS. 5, 6 and 7 is shown using a waveform technology welder. Control network or circuit 200 includes feedback error amplifier 202 for current and error amplifier 204 for voltage. These amplifiers compare the signals on lines 56, 66 with output lines 210, 212 respectively, from generator 70 to control the voltage level on control line 72, either in a digital format or analog form. The level of this signal controls either the voltage or current as previously explained. The pulse waveform is a current waveform best shown in FIG. 7 with a resulting voltage waveform C similar to the voltage waveform C in FIG. 3. Select circuit 220 selects the desired pulsed waveform B to be used by welder A. Timer 222 produces the lapsed time signals described in connection with FIG. 4. The output 222a of timer 222 is directed to summing junction 240 to create a reset signal in line 242. This resets timer 110, as shown in FIG. 2. A short circuit detector or sensing circuit 230 senses the existence of a short circuit, as previously used in implementing the prior art. This circuit is used in a different manner in the present invention. A short circuit sensed on line 66 and reference voltage signal on line 232 by circuit 230, which is normally a digital comparator, creates a signal in line 234 when there is a short circuit. This signal is directed to junction 240 which immediately creates a reset signal in line 242. Consequently, when using the invention, if there is a short circuit at point 120, as shown in FIG. 7, the waveform timer is reset to immediately start a new waveform. In FIG. 7 waveform B1 is followed by waveform B2. During the background portion of waveform B2 there is a short circuit at point 120. This immediately causes a signal in line 234 to start a new waveform B3. This new waveform rapidly clears the short circuit at point 120a and allows the welding process to continue. This procedure causes an immediate abrupt correction of the short circuit and automatically adjusts the heat according to the time spacing of point 120 from the start of the waveform. Program or routine 250 implements the present invention is shown in FIG. 6. Blocks 100, 102, 104, 106 are essentially the same as like blocks in FIG. 2 of the prior art program. However, in the illustrated embodiment of the present invention, a short circuit during either ramp down or during background current portion creates a signal in line 252 or 254. Both a short circuit during the ramp down of the pulse or during the background of the pulse causes a signal in line 234 as shown in FIG. 5. This resets timer 110 to cause circuit 260, shown in FIG. 5 as part of generator 70, to immediately start the next pulse. It has been found that immediate starting of the next pulse substantially increases the robust nature of the welding process and allows use of the pulse welding process for open root welding, as well as welding in all positions, one of which is schematically illustrated in FIG. 10. When using the invention, the short detector or sensor circuit 230 is implemented only during the ramp down portion and the background portion of waveform B. It is understood that the same network could be used in all portions of the waveform; however, a short circuit of the type anticipated by the present invention normally occurs during the time the pulse has melted a substantial amount of metal on the end of the electrode. The melted metal is awaiting spray or globular transfer to the workpiece. This normally does not occur at the start of the waveform or during peak current portion c. The invention can be used with welders not using waveform technology and where the pulses do not have the distinct ramp portions.

Figure 8:
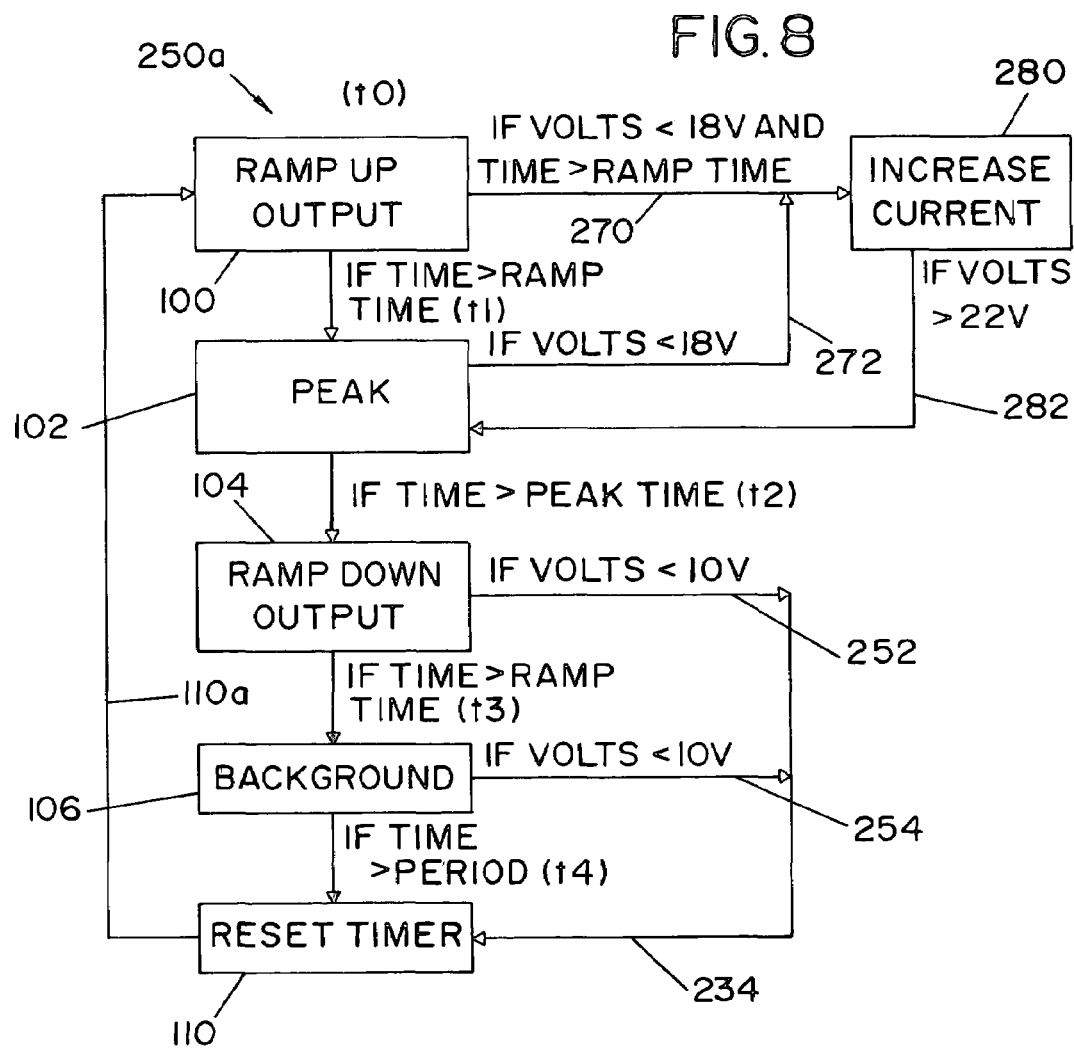
FIG. 8 is a flow chart of a pulsed spray welding process showing a program used in the present invention to clear a short circuit condition sustained after operation of the basic feature of the present invention.
Figure 9:
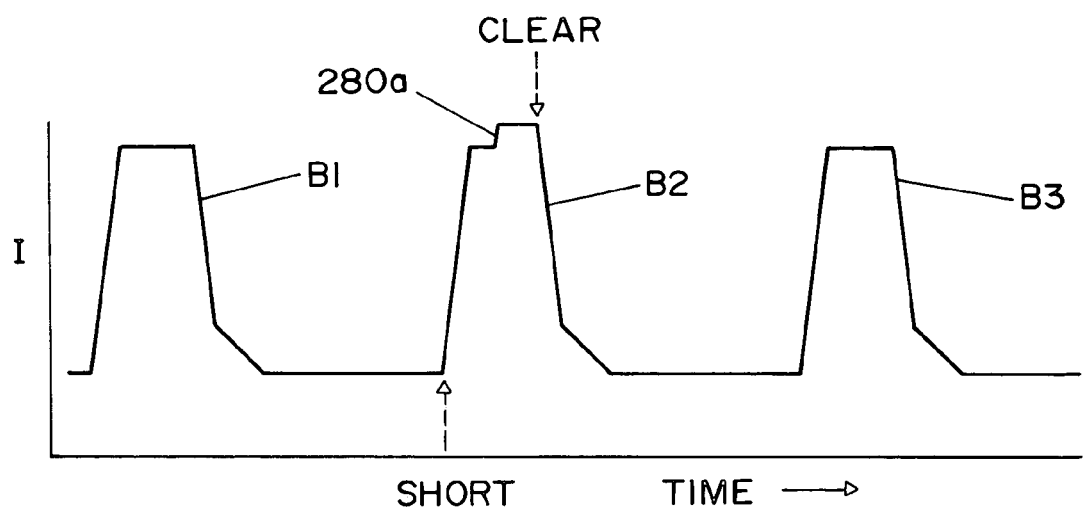
FIG. 9 is a chart illustrating the current waveform developed when using the added feature disclosed in the flow chart of FIG. 8; and, FIG. 10 is a cross sectional view illustrating a weld bead created by using the preferred embodiment of the present invention.

Another aspect of the invention is schematically illustrated in FIGS. 8 and 9. This optional feature is used with program 250 discussed and shown in FIG. 6 and is illustrated in combined program 250a. During the ramp up portion indicated as block 100, period timer 222 is operating to determine lapsed time T1. If this time has lapsed and the voltage is still less than 18 volts which is the reference voltage signal on line 232, a signal is created in line 270 of program 250a. This immediately causes an increase current at a controlled rate using standard circuit 280, which is a circuit that has been used to clear short circuits in the prior art. As the current increases beyond the normal profile of waveform B, as shown by the increased current 280a in FIG. 9, circuit 280 awaits a signal from the voltage sensed circuit 230 indicating that the voltage is greater than a reference, shown as 22 volts. This increased voltage indicates that current 280a has ruptured the short circuit. As soon as the short circuit has been cleared, a signal in line 282 causes routine or program 250a to return to its normal implementation by continuing the peak current portion as controlled by block 102. By using optional program 250a, as shown in FIG. 8, next pulse B$_3$ is immediately implemented. This is shown at point 120 in FIG. 7. If the selected pulse waveform has a time which has expired, but the short circuit continues, there is an increase current 280a as shown in FIG. 9. This same short circuit clearing process is implemented, if time has expired and there is still a short during the peak portion indicated by block 102. This Boolean event causes a signal in line 272 for activating or continuing the activation of increased current from clearing circuit 280. Consequently, preferred implementation of the present invention involves the immediate reset of the waveform timer by a short circuit during the ramp down or background portions of the waveform. If the waveform has no ramp down portion, the reset will operate only in the background portion. In the peak portion, circuit 280 clears a short circuit. This is an alternative to the preferred embodiment using a welder with waveform technology capabilities and using ramping in the waveform profile. During the ramp up and peak portions of the waveform of the illustrated embodiment, a short circuit merely increases the current in accordance with standard technology to burn away the short circuit. In practice, both programs 250 and 250a have been implemented. Solid wire with argon dominated shielding gas has been successfully used in open root welding, as well as fill welding of large workpieces. Thus, the invention allows use of a solid wire for GMAW-P welding.

FIG. 10 is a top view of a welding procedure illustrating use of the present invention for one position, shown as the 3G position with down welding. The process is equally applicable and beneficial for welding in all positions. Workpiece 300 has a thickness x which in practice is about 1.25 inches. Workpiece 302 has a width y which is about 2.0 inches. Gap z is approximately 0.20 inches with the grooved angle r being approximately 37.5°. The present invention was used to produce the weld 310 with a 0.052 inch, ER 80S-Nil electrode operating under a 95% argon 5% carbon dioxide shielding gas with a 1 inch CTWD. The first pass of the open root is welded vertical down using a modified J weave at 150 inches/minute wire feed speed. The remaining fill passes are welded in the vertical up progression at 150 inches/minute wire feed speed in a weave technique. The cap passes are welded at 200 inches/minute. This procedure produces satisfactory welds using the process of the present invention.

The method of the invention is reactive. When a short is detected, the logic skips the rest of the current waveform and starts the next pulse cycle, irrespective of the pulsing process used by the welder. If a short circuit is detected during the ramp down portion or background current portion of the waveform, or when there are no ramp portions during the background current portion, the logic of the control program skips the rest of the current pulse cycle and begins the next pulse cycle or waveform. Generally the short is cleared by the next abrupt segment of the waveform. In theory, a pulse waveform can be considered as two portions. A high heat portion including the peak current and a low heat portion, including the background current. When a short circuit occurs, the low heat portion is skipped and the high heat portion doubles. There will more heat placed into the welding process. As more short circuits occur, the improved method will put more heat into the welding process. The time when a short circuit is created will also dictate how much more heat is added. When the short circuit occurs early in the background current portion, the short circuit will require and receive more heat increase than a short circuit that happens later in the pulse waveform. The improved method self regulates the amount of heat increase depending upon the time in the waveform that the short circuit occurs. The improved method will act against excessive shorting events adding more heat as a direct relation to the number of short circuits that occur and when they occur. When using the enhanced version of the invention as shown in program 250*a*, short circuits that are difficult to clear receive further current. In practice, the current response is implemented when the short circuit still exists at the end of the ramp up portions or is detected in the peak portion of the waveform after reset timer 110 has been reset either by program 250 or by program 250*a*.

The invention has been described with current pulses; however, waveform B may be power, voltage or another function of the output of the welder. A current pulse is used as a general definition and includes such other pulses used in pulse welding.

Having thus defined the invention, the following claimed:

1. An electric arc welder with a waveform generator controlled to create a welding process involving current flow between an electrode and a workpiece, said welding process comprising a succession of current pulse waveforms each having a starting time, a current ramp up portion beginning at said starting time and having a set first lapsed time, a peak current portion with peak current and a second lapsed time, a current ramp down portion with a third lapsed time and a background current portion with a background current and a fourth lapsed time, a voltage sensing circuit to sense a short circuit between said electrode and said workpiece and a circuit to reset said waveform generator to said starting time to begin a new waveform upon sensing a short circuit.

2. An electric arc welder as defined in claim 1 wherein said voltage sensing circuit is activated only after said second lapsed time.

3. An electric arc welder as defined in claim 2 wherein said electrode is a solid wire with an outer shielding gas.

4. An electric arc welder as defined in claim 1 wherein said voltage sensing circuit is activated only during said background current portion.

5. An electric arc welder as defined in claim 1 including a short clearing circuit for increasing said current flow outside said pulse waveform upon sensing of a short before said second lapsed time.

6. An electric arc welder as defined in claim 5 wherein said electrode is a solid wire with an outer shielding gas.

7. An electric arc welder as defined in claim 4 wherein said electrode is a solid wire with an outer shielding gas.

8. An electric arc welder as defined in claim 1 wherein said electrode is a solid wire with an outer shielding gas.

9. An electric arc welder with a waveform generator controlled to create a welding process involving current flow between an electrode and a workpiece, said welding process comprising a succession of current pulse waveforms each having a current ramp up portion, a peak current portion, a current ramp down portion and a background current portion, a voltage sensing circuit to sense a short circuit between said electrode and said workpiece and a circuit to reset said waveform generator to restart said pulse waveform at the ramp up portion upon sensing a short circuit.

10. An electric arc welder as defined in claim 9 wherein said voltage sensing circuit is activated only after said peak current portion.

11. An electric arc welder as defined in claim 10 wherein said electrode is a solid wire with an outer shielding gas.

12. An electric arc welder as defined in claim 9 wherein said voltage sensing circuit is activated only during said background current portion.

13. An electric arc welder as defined in claim 12 wherein said electrode is a solid wire with an outer shielding gas.

14. An electric arc welder as defined in claim 9 including a short clearing circuit for increasing said current flow outside said pulse waveform upon sensing of a short circuit after said current ramp up portion and before said current ramp down portion.

15. An electric arc welder as defined in claim 14 wherein said electrode is a solid wire with an outer shielding gas.

16. An electric arc welder as defined in claim 9 wherein said electrode is a solid wire with an outer shielding gas.

17. A method of electric arc welding with a waveform generator controlled to create a welding process involving current flow between an electrode and a workpiece, said welding process comprising a succession of current pulse waveforms each having a current ramp up portion, a peak current portion, a current ramp down portion and a background current portion, said method comprising:

(a) sensing a short circuit between said electrode and said workpiece; and, (b) resetting said waveform generator by starting a next waveform at the ramp up portion upon sensing a short circuit.

18. The method as defined in claim 17 wherein said resetting act is possible only after said peak current portion.

19. The method as defined in claim 18 wherein said electrode is a solid wire with an outer shielding gas.

20. The method as defined in claim 17 wherein said resetting act is possible only during said background current portion.

21. The method as defined in claim 20 wherein said electrode is a solid wire with an outer shielding gas.

22. A method as defined in claim 17 including the additional act of:

(c) clearing a short circuit by increasing said current flow outside said pulse waveform upon sensing of a short circuit after said current ramp up portion and before said current ramp down portion.

23. The method as defined in claim 22 wherein said electrode is a solid wire with an outer shielding gas.

24. The method as defined in claim 17 wherein said electrode is a solid wire with an outer shielding gas.

25. An electric arc welder with a waveform generator controlled to create a welding process involving current flow between an electrode and a workpiece, said welding process comprising a succession of pulse waveforms each having a current ramp up portion, a peak current portion, a current ramp down portion and a background current portion, a voltage sensing circuit to sense a short circuit between said electrode and said workpiece and a reset circuit to reset said waveform generator to start a new pulse waveform with a new peak current portion upon sensing of a short circuit.

26. An electric arc welder as defined in claim 25 wherein said reset circuit is operable only after said peak current portion of said waveform.

27. An electric arc welder as defined in claim 26 including a short clearing circuit for cleaning a sustained short circuit by increasing said current flow outside said waveform during said peak portion of said waveform.

28. An electric arc welder as defined in claim 27 wherein said electrode is a solid wire with an outer shielding gas.

29. An electric arc welder as defined in claim 26 wherein said electrode is a solid wire with an outer shielding gas.

30. An electric arc welder as defined in claim 25 wherein said electrode is a solid wire with an outer shielding gas.

31. A method of electric arc welding with a waveform generator controlled to create a welding process involving current flow between an electrode and a workpiece, said welding process comprising a succession of pulse waveforms each having a current ramp portion, a peak current portion, a current ramp down portion and a background current portion, a voltage sensing circuit to sense a short circuit between said electrode and said workpiece, said method comprising:
(a) detecting any short circuit between said electrode and said workpiece; and,
(b) resetting said waveform generator upon sensing of a short circuit to immediately start a new next waveform beginning at the ramp up portion after a sensed short circuit.

32. A method as defined in claim 31 wherein said resetting act is operable only after said peak current portion of said waveform.

33. The method as defined in claim 32 wherein said electrode is a solid wire with an outer shielding gas.

34. A method as defined in claim 31 including the additional act of:
(c) increasing said current flow outside said waveform during said peak portion of said new next waveform, when there is a sustained short circuit at the start of new next waveform.

35. The method as defined in claim 34 wherein said electrode is a solid wire with an outer shielding gas.

36. The method as defined in claim 31 wherein said electrode is a solid wire with an outer shielding gas.

37. An electric arc welder with a program to create a welding process involving current flow between an electrode and a workpiece, said welding process comprising a succession of pulse waveforms each having a starting time, a peak portion with a peak parameter, said peak portion beginning at said starting time, and a background portion with a background parameter, a voltage sensing circuit to sense a short circuit between said electrode and said workpiece and a circuit to reset said program to said starting time of the next waveform upon sensing a short circuit.

38. An electric arc welder as defined in claim 37 wherein said voltage sensing circuit is activated only during said background current portion.

39. An electric arc welder as defined in claim 38 wherein said solid wire is a metal cored wire.

40. An electric arc welder as defined in claim 37 including a short clearing circuit for increasing said current flow outside said pulse waveform upon sensing of a short before said background current portion.

41. An electric arc welder as defined in claim 40 wherein said electrode is a solid wire with an outer shielding gas.

42. An electric arc welder as defined in claim 37 wherein said electrode is a solid wire with an outer shielding gas.

43. An electric arc welder as defined in claim 42 wherein said parameter is selected from the class consisting of current, voltage, power and energy.

44. An electric arc welder with a program to create a welding process involving current flow between an electrode and a workpiece, said welding process comprising a succession of current pulse waveforms each having a peak current portion and a background current portion, a voltage sensing circuit to sense a short circuit between said electrode and said workpiece and a circuit to reset said waveform to restart said pulse waveform by beginning a new peak portion upon sensing a short circuit.

45. An electric arc welder as defined in claim 44 wherein said voltage sensing circuit is activated only after said peak current portion.

46. An electric arc welder as defined in claim 44 wherein said voltage sensing circuit is activated only during said background current portion.

47. An electric arc welder as defined in claim 44 including a short clearing circuit for increasing said current flow outside said pulse waveform upon sensing of a short circuit before said background portion.

48. An electric arc welder as defined in claim 44 wherein said electrode is a solid wire with an outer shielding gas.

49. A method of electric arc welding with a pulsed spray welding process involving current flow between an electrode and a workpiece, said welding process comprising a succession of pulse waveforms each having a peak portion, a background portion, said method comprising:
(a) sensing a short circuit between said electrode and said workpiece in a current waveform; and,
(b) starting a next waveform upon a short circuit without completing said current waveform.

50. The method as defined in claim 49 wherein said starting act is possible only during said background portion.

51. A method as defined in claim 49 including the additional act of:
(c) clearing a short circuit by increasing said current flow outside said pulse waveform upon sensing of a short circuit during said peak portion.

52. The method as defined in claim 49 wherein said electrode is a solid wire with an outer shielding gas.

53. An electric arc welder to create a pulsed spray welding process involving current flow between an electrode and workpiece, said welding process comprising a succession of pulse waveforms that individually include a pulse portion beginning at a starting time, a voltage sensing circuit to sense a short circuit between said electrode and said workpiece and a reset circuit to start a new waveform by beginning a new pulse portion upon sensing of a short circuit.

54. A method of electric arc welding by creating a pulsed spray welding process involving a succession of pulse waveforms beginning at a starting time, a voltage sensing circuit to sense a short circuit between said electrode and said workpiece, said method comprising:
(a) detecting any short circuit between said electrode and said workpiece; and,
(b) immediately starting a new next waveform at the starting time after a sensed short circuit.

55. The method as defined in claim 54 wherein said electrode is a solid wire with an outer shielding gas.

* * * * *